United States Patent [19]

Cuscurida

[11] Patent Number: 5,017,676
[45] Date of Patent: May 21, 1991

[54] ACETOACETOXYETHYL METHACRYLATE IN THE CURE OF EPOXY RESINS

[75] Inventor: Michael Cuscurida, Austin, Tex.

[73] Assignee: Texaco Chemical Company, White Plains, N.Y.

[21] Appl. No.: 451,686

[22] Filed: Dec. 18, 1989

[51] Int. Cl.$^5$ .................. C08L 63/02; C08L 63/04; C08G 59/50; C08G 59/68

[52] U.S. Cl. .................. 528/121; 528/123; 528/124; 525/420.5; 525/423; 525/504; 525/530; 525/502

[58] Field of Search .................. 525/530, 420.5, 423, 525/504, 502; 528/123, 124

[56] References Cited

U.S. PATENT DOCUMENTS

| | | | |
|---|---|---|---|
| 3,236,895 | 2/1966 | Lee et al. | 528/60 |
| 3,462,393 | 8/1969 | Legler | 525/524 |
| 3,658,878 | 4/1972 | Smith | 558/303 |
| 3,864,358 | 2/1975 | Porret et al. | 526/258 |
| 3,875,072 | 4/1975 | Waddill | 528/94 |
| 4,144,208 | 3/1979 | Fuchs et al. | 526/292 |
| 4,181,526 | 1/1980 | Blakely et al. | 526/272 |
| 4,189,564 | 2/1980 | Waddill | 528/94 |
| 4,195,153 | 3/1980 | Waddill | 528/94 |
| 4,284,547 | 8/1981 | Sullick | 525/43 |
| 4,518,749 | 5/1985 | Waddill et al. | 525/504 |
| 4,588,788 | 5/1986 | Emmons et al. | 525/530 |
| 4,661,553 | 4/1987 | Hefner, Jr. | 525/531 |
| 4,766,186 | 8/1988 | Sellstrom et al. | 525/532 |

FOREIGN PATENT DOCUMENTS

| | | |
|---|---|---|
| 3149797 | 6/1983 | Fed. Rep. of Germany . |
| 3149797 | 6/1983 | Fed. Rep. of Germany . |
| 3536246 | 4/1987 | Fed. Rep. of Germany ...... 525/530 |
| 1144486 | of 0000 | United Kingdom . |

OTHER PUBLICATIONS

*Hackh's Chemical Dictionary*, 4th Edition, McGraw-Hill Book Co., New York, N.Y., 1969, p. 527.
Texaco Chemical Co., "Jeffamine ® EDR Series of Polyetheramines", Advance Technical Data Sheet, 2 pages.
Texaco Chemical Co., "Jeffamine ® EDR-148 (Triethyleneglycolchamine)", Bulletin No. NPD-030 102-0366, 1986, 6 pages.
Technical Bulletin, Jeffamine ® EDR-148, Texaco Chemical Company.
Publication No. 322, "Utility of AAEM in Thermoset Coatings", Eastman Kodak Co., Nov., 1988.
Publication No. 319, "Acetoncetoxylethyl Methacrylate and Acetoacetyl Chemistry", Eastman Kodak Co., Oct. 1988.
*Handbook of Epoxy Resins*, H. Lee & K. Neville, pp. 7-2.
Advance Technical Bulletin Concerning Jeffamine ® EDR-148, Texaco Chemical Company.
New Product Development Technical Bulletin concerning Jeffamine ® EDR-148; Texaco Chemical Company.

*Primary Examiner*—John C. Bleutge
*Assistant Examiner*—Robert E. Lee Sellers, II
*Attorney, Agent, or Firm*—Jack H. Park; Kenneth R. Priem

[57] ABSTRACT

A method for curing a 1,2-epoxy resin by mixing the resin with an effective amount of an amine curing agent under epoxy resin curing conditions and accelerating the cure with acetoacetoxyethyl methacrylate (AAEM).

6 Claims, No Drawings

ACETOACETOXYETHYL METHACRYLATE IN THE CURE OF EPOXY RESINS

BACKGROUND OF THE INVENTION

1. Field of the Invention

This invention relates to accelerating the cure of epoxy resins.

2. Discussion of Prior Publications

Epoxy resins constitute a broad class of polymeric materials having a wide range of physical characteristics. The resins are characterized by epoxide groups which are cured by reaction with catalysts or curing agents to provide cured epoxy resin compositions with certain desirable properties.

U.S. Pat. No. 4,518,749 to H. G. Waddill teaches an epoxy resin composition comprising a polyepoxide and a curing amount of a bis(hydrogen maleate) derivative of a polyoxypropylenediamine. Example 3 teaches that tris(dimethylaminomethyl)phenol is an accelerator for the curing of an epoxy resin. Handbook of Epoxy Resins, H. Lee and K. Neville, p. 7-2 states that in curing epoxy resins with amines, that tris(dimethylaminomethyl)phenol is superior to phenol.

U.S. Pat. No. 3,875,072 to H. G. Waddill teaches a composition which is synergistic for accelerating the curing of a polyglycidyl ether of a polyhydric phenol cured with a polyoxyalkylenepolyamine. The composition comprises piperazine and an alkanolamine in a weight ratio of 1:8 to 1:1.

U.S. Pat. No. 4,195,153 to H. G. Waddill teaches an epoxy resin curing accelerator comprising a mixture of N-aminoethylpiperazine (AEP) and triethanolamine (TEA).

U.S. Pat. No. 4,189,546 to H. G. Waddill teaches an epoxy resin curing accelerator comprising a mixture of piperazine, N-aminoethylpiperazine (AEP) and triethanolamine (TEA). The mixture is synergistic for curing an epoxy resin with an amine at ambient or elevated temperature.

U.S. Pat. No. 3,236,895 to J. M. Lee and J. C. Winfrey and U.S. Pat. No. 3,462,393 to Legler are pioneer patents. They describe a series of amine compounds which are solids or liquids and have utility particularly in curing epoxy resins. The amine compounds have the general formula:

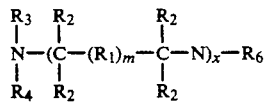

wherein R's are selectively defined as hydrogen, alkyl radicals and alkylene oxide radicals and x and m are defined integers.

U.S. Pat. No. 3,864,358 to D. Porret and J. Habermeier describes epoxy-acrylic acid esters obtained when 3-(acryloyl-oxyalkyl)-hydantoins are glycidylated. Both 2,4,6-tris(dimethylaminoethyl)phenol and N-(2-aminoethyl)piperazine are mentioned as epoxy resin curing agents. The compound 2,4,6-tris(dimethylaminoethyl)phenol is taught as an accelerator for the curing of epoxy resins. In contrast, these compounds are used in combination, in small amounts as an accelerator in the instant invention.

U.S. Pat. No. 4,284,547 to M. M. Bagga teaches diglycidyl ethers of di-secondary alcohols as epoxy resins. Both 2,4,6-tris(dimethylaminoethyl)phenol and N-(2-aminoethyl)piperazine are mentioned as curing agents for epoxy resins. Accelerators include 2,4,6-tris(dimethylaminomethyl)phenol.

SUMMARY OF THE INVENTION

A method for curing a 1,2-epoxy resin by mixing the resin with an effective amount of an amine curing agent under epoxy resin curing conditions and accelerating the cure with acetoacetoxyethyl methacrylate (AAEM).

The invention is also a composition comprising an epoxy resin and an accelerator comprising acetoacetoxyethyl methacrylate.

DETAILED DESCRIPTION OF THE INVENTION

According to one embodiment of the instant inventive concept, a blend of a 1,2 epoxy resin (polyepoxide), an amine curing agent and an accelerator comprising acetoacetoxyethyl methacrylate are thoroughly admixed and cured in accordance with conventional methods to provide cured epoxy resins having excellent properties.

I have found that in addition to aiding the cure of the epoxy resin, the acetoacetoxyethyl methacrylate forms a polymer when reacted with the polyoxyalkyleneamine curing agent thereby resulting in cured epoxy resins which are harder with higher tensile and flexural modulus as compared to resins cured with polyoxyalkyleneamines alone.

Generally the vicinal polyepoxide containing compositions which may be cured with the products of the invention are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the base resin, which has an epoxide equivalent weight (EEW) of from 175 to 195, is derived from condensing epichlorohydrin with 2,2-bis(p-hydroxyphenyl propane) to form 2,2-bis[p-2,3 epoxy propoxy)phenyl] propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol,
2,4'-dihydroxydiphenylethylmethane,
3,3'-dihydroxydiphenyldiethylmethane,
3,4'-dihydroxydiphenylmethylpropylmethane, 2,3'-dihydroxydiphenylethylphenylmethane,
4,4'-dihydroxydiphenylpropylphenylmethane,
4,4'-dihydroxydiphenylbutylphenylmethane,
2,2'-dihydroxydiphenylditolylmethane,
4,4'-dihydroxydiphenyltolylmethylmethane and the like. Other polyhydric phenols which may also be coreacted with an epihalohydrin to provide these epoxy polyethers are such compounds as resorcinol, hydroquinone, substituted hydroquinones, e.g. methylhydroquinone, and the like.

Among the polyhydric alcohols which can be coreacted with an epihalohydrin to provide these resinous epoxy polyethers are such compounds as ethylene glycol, propylene glycols, butylene glycols, pentane diols, bis(4-hydroxycyclohexyl)-dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-,3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured by the products of the invention in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The amine curing agents which can be utilized in accordance with the instant invention are generally any of those amine curing agents which are well known to be useful for the curing of vicinal epoxies. Generally, those curing agents having at least three reactive amino hydrogens are useful.

Exemplary of those amines which can be utilized are alkylene polyamines such as diethylenetriamine, triethylenetetramine and the like, polyoxyalkylenepolyamines such as polyoxypropylene, di-and triamine in the 200–2000 mw range and 1,13-diamino 4,7,10-trioxatridecane.

Additionally, aromatic amine curing agents are useful, such as the alkylene-linked polyphenylamines, phenylenediamines and polycyclic or fused aromatic primary amine compounds. Additionally the corresponding cycloaliphatic compounds can be used.

Likewise, the polyamide curing agents such as the condensation products of polyamines and polycarboxylic acids are useful. Suitable such amide compounds are, for example, the condensation product of a polyamine and a dimerized fatty acid produced in accordance with U.S. Pat. No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

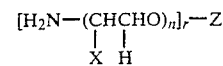

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. Preferred polyoxyalkylene polyamines are the polyoxypropylenediamines wherein X is a methyl radical, n is a number from 1 to 10, Z is a 1,2-propylene radical and r is about 2. These polyoxyalkylenepolyamines can be prepared by known methods as disclosed in U.S. Pat. Nos. 3,236,895 and 3,654,370. A preferred polyoxyalkylenepolyamine is a polyoxypropylenediamine having a molecular weight of about 230.

Another preferred class of polyoxyalkylenepolyamines can be depicted by the formula:

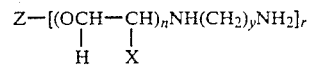

wherein X,Z, n and r are defined above and y is 2 or 3. These poly(aminoalkylamino)polyethers are the hydrogenated product of a cyanoalkylated adduct of a polyoxyalkylenepolyamine as described. The preparation of the cyanoalkylated adducts is described in U.S. Pat. No. 3,666,788 to Rowton.

Also preferred curing agents are triethyleneglycol diamine and tetraethyleneglycoldiamine. These materials are sold under a tradename JEFFAMINE® EDR-148 triethyleneglycoldiamine and JEFFAMINE EDR-192 tetraethyleneglycoldiamine.

The amount of acetoacetoxyethyl methacrylate to be used will depend on the degree of acceleration desired. Generally based on the total formulation in an effective amount will range from as low as about 2 weight percent to about 20 weight percent. Preferred amounts range from about 4 to about 9 weight percent of acetoacetoxyethyl methacrylate.

EXAMPLES

The following examples illustrate the instant invention.

EXAMPLE 1

The exothermic data of an epoxy resin of EEW 188 cured with JEFFAMINE EDR-148 diamine in the presence of acetoacetoxyethyl methacrylate is shown in the following table. The data clearly show that JEFFAMINE EDR-148 diamine is more reactive in the presence of acetoacetoxyethyl methacrylate This can be seen in the gel time and the time to peak exotherm in these formulations.

|  | Sample | | |
| --- | --- | --- | --- |
|  | A | B | C |
| Formulation pbw |  |  |  |
| Epoxy resin EEW 188, g | 166.67 | 157.4 | 148 |
| AAEM, g | — | 8.28 | 16.47 |
| JEFFAMINE EDR-148, g | 33.33 | 34.3 | 35.32 |
| Results |  |  |  |
| Brookfield viscosity, ~22° C. | 668 | 515 | 500 |
| Gel time, min (200 g mass) | 72.8 | 46.4 | 25.2 |
| Peak exotherm, °C. | 228 | 220 | 217 |
| Time to peak exotherm, min. | 74 | 48 | 27.2 |

EXAMPLE 2

The example will show the use of acetoacetoxyethyl methacrylate as an accelerator in the cure of Epon 828 resin with aminoethylpiperazine.

|  | Sample | |
| --- | --- | --- |
|  | A | B |
| Formulation pbw |  |  |
| Epoxy resin EEW 188, g | 162.6 | 153.8 |
| Aminoethylpiperazine, g | 37.4 | 38.1 |
| AAEM, g | — | 8.1 |
| Results |  |  |
| Brookfield viscosity, ~22° C. | 1150 | 900 |
| Gel time, min. | 18.4 | 11.4 |
| Peak exotherm, °C. | 258 | 244 |
| Time to peak exotherm, min. | 20.4 | 12.4 |

EXAMPLE 3

This example will show the use of acetoacetoxyethyl methacrylate as an accelerator in the cure of Epon 828 resin with JEFFAMINE EDR-148. It will further show that heat cured castings were harder and stiffer than those cured with JEFFAMINE EDR-148 alone. Formulation and properties are as follows:

|  | Sample | | |
| --- | --- | --- | --- |
|  | A | B | Control |
| Formulation, obw |  |  |  |
| Epoxy resin EEW 188, g | 196.75 | 185 | 208.3 |
| AAEM, g | 10.35 | 20.58 | — |
| JEFFAMINE EDR-148, g | 42.88 | 44.15 | 41.7 |
| PC-1244 acrylic polymer, g | 0.1 | 0.1 | 0.1 |
| Properties of cured ⅛-in castings[a] |  |  |  |
| Shore D hardness, 0–10 sec. | 86-83 | 86-84 | 81-79 |
| HDT, °C, 264 psi | 67.2 | 41.8 | 87 |
| Izod impact, ft-lb/in | 0.111 | 0.109 | 0.28 |
| Tensile strength, psi | 9341 | 9143 | 8900 |
| Tensile modulus, psi | 454067 | 538900 | 361500 |
| Elongation at break, % | 5.94 | 5.8 | 11.0 |
| Flexural strength, psi | 15841 | 15667 | 12600 |
| Flexural modulus, psi | 414450 | 431814 | 343000 |

[a]Cured 2 hrs. at 80° C. and 3 hrs. at 125° C.

EXAMPLE 4

This example will show the use of acetoacetoxyethyl methacrylate as an accelerator in the cure of Epon 828 resin with JEFFAMINE EDR-148 diamine. It will further show that ambient cured coatings were harder than those cured with JEFFAMINE EDR-148 along. Formulation and properties are as follows:

|  | Sample | | |
| --- | --- | --- | --- |
|  | A | B | Control |
| Formulation, pbw |  |  |  |
| Epoxy resin EEW 188, g | 196.75 | 185 | 208.3 |
| AAEM, g | 10.35 | 20.58 | — |
| JEFFAMINE EDR-148, g | 42.88 | 44.15 | 41.7 |
| PC-1244 acrylic polymer, g | 0.1 | 0.1 | 0.1 |
| Properties of cured ⅛-in. castings[a] |  |  |  |
| Shore D hardness, 0–10 sec. | 89-83 | 85-81 | 75-72 |
| HDT, 264 psi | 47.4 | 35.8 | 44 |
| Izod impact, ft-lb/in | 0.097 | 0.096 | 0.28 |
| Tensile strength, psi | 9356 | 8881 | 9800 |
| Tensile modulus, psi | 549100 | 464733 | 504000 |
| Elongation at break, % | 3.06 | 3.44 | 4.0 |
| Flexural strength, psi | 15504 | 15378 | 16100 |
| Flexural modulus, psi | 434342 | 436664 | 492000 |
| % wt. gain, 3-hr acetone boil | 12.39 | 14.17 | 12.0 |
| % wt. gain, 24-hr water boil | 3.73 | 4.07 | 3.7 |

[a]Cured five days at room temperature

EXAMPLE 5

The example will show that polymeric substances were formed when acetoacetoxyethyl methacrylate was mixed with various polyoxyalkylene amines.

|  | Sample | | | | |
| --- | --- | --- | --- | --- | --- |
|  | A | B | C | D | E |
| Composition, pbw |  |  |  |  |  |
| JEFFAMINE D-400*, g | 5 | 10 | 10 | 10 | — |
| JEFFAMINE D-230**, g | — | — | — | — | 10 |
| AAEM, g | 9.2 | 9.2 | 4.6 | 3.1 | 17.8 |
| NH$_2$/AAEM eq. | 0.5 | 1.0 | 2.0 | 3.0 | 1.0 |
| Results |  |  |  |  |  |
| Gel time, min | Milky after one hr., no gel | 60 Opaque polymer formed | 60 Clear polymer formed | 90 Clear polymer formed | 45 Opaque polymer formed |

*Polyoxypropylenediamine of about 400 molecular weight.
**Polyoxypropylenediamine of about 230 molecular weight.

EXAMPLE 6

This example will show the use of acetoacetoxyethyl methacrylate in the cure of Epon 828 resin with JEFFAMINE D-230. It will further show that the heat cured castings were harder and stiffer than those cured with JEFFAMINE D-230 along.

|  | Sample | | |
| --- | --- | --- | --- |
|  | A | B | Control |
| Formulation, pbw |  |  |  |
| Epoxy resin EEW 188, g | 177.8 | 168 | 189.4 |
| AAEM, g | 9.35 | 17.67 | — |
| JEFFAMINE D-230, g | 62.8 | 64.3 | 60.6 |
| PC-1244 acrylic polymer, g | 0.1 | 0.1 | 0.1 |
| Properties of cured ⅛-in. castings[a] |  |  |  |
| Shore D hardness, 0–10 sec. | 90-95 | 87-83 | 77-74 |
| HDT, °C., 264 psi | 64.3 | 54.9 | 80 |
| Izod impact, ft-lb/in | 0.075 | 0.106 | 0.15 |
| Tensile strength, psi | 9460 | 9392 | 9800 |
| Tensile modulus, psi | 459000 | 467700 | 417500 |
| Elongation of break, % | 5.87 | 4.67 | 9.6 |
| Flexural strength, psi | 448500 | 462800 | 454000 |

-continued

|  | Sample | | |
| --- | --- | --- | --- |
|  | A | B | Control |
| Flexural modulus, psi | 16540 | 16370 | 15700 |

*Cured 2 hrs. at 80° C. and 3 hrs. at 125° C.

I claim:

1. A composition comprising an epoxy resin, an amine curing agent and an amount of acetoacetoxyethyl methacrylate effective for accelerating the cure of the epoxy resin to a hand, stiff product.

2. A composition as in claim 1 wherein the amine curing agent is triethyleneglycoldiamine.

3. A composition as in claim 1 wherein the amine curing agent is tetraethyleneglycoldiamine.

4. A composition as in claim 1 wherein the amine curing agent is polyoxypropylenediamine.

5. A method for curing a 1,2 epoxy resin wherein an effective amount of an amine curing agent is intimately mixed with a 1,2 epoxy resin under epoxy resin curing conditions to obtain a hand, stiff product, the improvement which comprises using as an accelerator an amount of acetoacetoxyethyl methacrylate ranging from about 2 weight percent to 20 weight percent based on the entire formulation.

6. A method for curing a 1,2 epoxy resin wherein an effective amount of an amine curing agent is intimately mixed with a 1,2 epoxy resin under epoxy resin curing conditions to obtain a hand, stiff product, the improvement which comprises using as an accelerator an amount of acetoacetoxyethyl methacrylate ranging from about 4 weight percent to about 8.2 weight percent based on the entire formulation.

* * * * *